(12) United States Patent
Martuscelli et al.

(10) Patent No.: US 11,211,619 B2
(45) Date of Patent: Dec. 28, 2021

(54) FUEL CELL ARCHITECTURES, AFTERTREATMENT SYSTEMS, AND CONTROL LOGIC FOR EXHAUST WATER EXTRACTION

(71) Applicant: GM GLOBAL TECHNOLOGY OPERATIONS LLC, Detroit, MI (US)

(72) Inventors: John A. Martuscelli, Shelby Township, MI (US); Jared Phillips, Madison Heights, MI (US); Anahita Rastkar, King City (CA); Jeffrey A. Bozeman, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 199 days.

(21) Appl. No.: 16/599,617

(22) Filed: Oct. 11, 2019

(65) Prior Publication Data
US 2021/0111421 A1 Apr. 15, 2021

(51) Int. Cl.
*H01M 8/04291* (2016.01)
*H01M 8/22* (2006.01)

(52) U.S. Cl.
CPC ....... *H01M 8/04291* (2013.01); *H01M 8/222* (2013.01)

(58) Field of Classification Search
None
See application file for complete search history.

(56) References Cited

U.S. PATENT DOCUMENTS

| | | |
|---|---|---|
| 3,455,743 A | 7/1969 | Huebscher et al. |
| 5,478,662 A | 12/1995 | Strasser |
| 6,602,624 B1 | 8/2003 | Doan et al. |
| 6,835,477 B1 | 12/2004 | Brambilla et al. |
| 6,841,292 B2 | 1/2005 | Nelson et al. |
| 6,866,955 B2 | 3/2005 | Lee et al. |
| 7,160,341 B2 | 1/2007 | Sinha et al. |
| 7,264,895 B2 | 9/2007 | White |
| 7,759,010 B2 | 7/2010 | Hoch |
| 7,955,743 B2 | 6/2011 | Ganapathy et al. |
| 8,313,871 B2 | 11/2012 | Wexel et al. |
| 8,603,654 B2 | 12/2013 | Cartwright et al. |
| 2004/0058224 A1 | 3/2004 | Eshraghi et al. |
| 2008/0050640 A1 | 2/2008 | Sun et al. |
| 2011/0039190 A1 | 2/2011 | Owejan et al. |

(Continued)

*Primary Examiner* — Daniel S Gatewood
(74) *Attorney, Agent, or Firm* — Quinn IP Law (57) ABSTRACT

Presented are fuel cell systems and control logic for extracting water from system exhaust, methods for making/using such systems, and electric-drive vehicles with aftertreatment systems for extracting water from fuel cell exhaust. An aftertreatment system for a fuel cell stack includes a condensate generator that fluidly connects to the fuel cell stack to receive exhaust output therefrom. The condensate generator includes an evaporator core with a refrigerant line that actively cool the exhaust via controlled circulation of refrigerant fluid. A condensate collector fluidly connected to the condensate generator includes a reservoir housing with a condensate trap that separates entrained water vapor from the cooled exhaust. The reservoir housing collects the separated water vapor as liquid water. A liquid storage container fluidly connected to the condensate collector receives and stores the collected water. An expansion valve regulates the amount of refrigerant fluid passed into the evaporator core through the refrigerant line.

15 Claims, 2 Drawing Sheets

(56) References Cited

U.S. PATENT DOCUMENTS

| | | |
|---|---|---|
| 2011/0207012 A1 | 8/2011 | Frost et al. |
| 2014/0335432 A1 | 11/2014 | Sinha et al. |
| 2015/0180079 A1 | 6/2015 | Leger et al. |
| 2017/0058420 A1 | 3/2017 | Goulet et al. |
| 2019/0252705 A1 | 8/2019 | Mathias et al. |

FUEL CELL ARCHITECTURES, AFTERTREATMENT SYSTEMS, AND CONTROL LOGIC FOR EXHAUST WATER EXTRACTION

INTRODUCTION

The present disclosure relates generally to electrochemical fuel cell systems for converting hydrogen-based fuels into electricity. More specifically, aspects of this disclosure relate to systems and methods for extracting water from fuel cell system exhaust.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles, on the other hand, utilize alternative power sources to propel the vehicle, such as electric motor generator units (MGU), and therefore minimize or eliminate reliance on a fossil-fuel based engine for tractive power.

Hybrid electric and full electric (collectively "electric-drive") powertrains take on various architectures, some of which utilize a fuel cell system to supply power for one or more electric traction motors. A fuel cell is an electrochemical device generally composed of an anode electrode that receives hydrogen ($H_2$), a cathode electrode that receives oxygen ($O_2$), and an electrolyte interposed between the anode and cathode. An electrochemical reaction is induced to oxidize hydrogen molecules at the anode to generate free protons (H+), which are then passed through the electrolyte for reduction at the cathode with an oxidizing agent, such as oxygen. In particular, hydrogen gas is catalytically split in an oxidation half-cell reaction in the anode catalyst layer to generate free hydrogen protons and electrons. These hydrogen protons pass through the electrolyte to the cathode, where the hydrogen protons react with oxygen and electrons in the cathode to form various stack by-products. Electrons from the anode, however, cannot pass through the electrolyte; these electrons are redirected through a load, such as a vehicle's traction motor or a non-vehicular load requiring stationary power generation, before being sent to the cathode.

Fuel cell designs commonly employed in automotive applications utilize a solid polymer electrolyte membrane (PEM)—also referred to as a "proton exchange membrane" (PEM)—to provide ion transport between the anode and cathode. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes, in addition to conduction of protons. The anode and cathode typically include finely dispersed catalytic particles, such as platinum, supported on carbon particles and mixed with an ionomer. This catalytic mixture is deposited on the sides of the membrane to form the anode and cathode layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

To generate the requisite electricity for powering a motor vehicle, numerous fuel cells are typically combined, in series or in parallel, into a fuel cell stack to achieve a higher output voltage and allow for stronger current draw. For example, a typical fuel cell stack for an automobile may have in excess of two hundred stacked cells. These fuel cell stacks receive reactant gas as a cathode input, typically as a metered flow of ambient air or concentrated gaseous oxygen forced through the stack by a compressor. During normal operation, a quantifiable mass of the oxygen is not consumed by the stack; some of the remnant oxygen is output as cathode waste gas that may include water as a stack by-product. The fuel cell stack also receives hydrogen or hydrogen-rich reactant gas as an anode input that flows into the anode side of the stack. The distribution of hydrogen within the anode flow channels is typically held substantially constant for proper fuel cell stack operation. In some operational modes, supplementary hydrogen is fed into the fuel cell stack so that the anode gas is evenly distributed to achieve a calibrated stack output load. Additionally, a fuel cell stack may be operated in a manner that maintains the MEAs in a humidified state; gases supplied to the fuel cell stack may be humidified to prevent the drying of the MEAs. Exhaust generated by the fuel cell stack may therefore include water vapor, liquid water, air, low levels of waste hydrogen gas and other trace elements.

SUMMARY

Presented herein are fuel cell systems with attendant control logic for extracting water from system exhaust, methods for making and methods for using such systems, and electric-drive vehicles with aftertreatment systems for extracting entrained water from fuel cell system exhaust. By way of example, there are presented fuel cell architectures with exhaust aftertreatment systems designed to extricate and transfer liquid water from the moisture-rich waste gases output from the system's cathode-side diffusion media. The exhaust system contains an exhaust preconditioner providing passive air-to-heat exchange to cool the exhaust. A condensate generator, which is located fluidly downstream from the exhaust preconditioner, employs an evaporator core with refrigerant lines that provide active exhaust cooling sufficient to induce condensation. A condensate collector fluidly downstream from the condensate generator provisions water separation and noise mitigation, pumping separated liquid water to a fluid-tight water storage container for stowing and supplying collected water. A cyclone-type, two-phase flow separator may be fluidly interposed between the condensate generator and collector to instigate water separation through centrifugation. An electric or thermostatic expansion device, capillary tube, or controlled orifice device may be provided to selectively increase and decrease the amount of water extracted from the fuel cell system's exhaust. The system employs both active and passive processes to extract, capture, and store water on-demand during fuel cell operation.

Aspects of this disclosure are directed to fuel cell system architectures with attendant control logic for extricating entrained water from system exhaust. By way of non-limiting example, an exhaust aftertreatment system is presented for extracting water from the exhaust output of an electrochemical fuel cell stack operable to convert hydrogen-based fuel into electricity. The exhaust aftertreatment system includes a condensate generator that fluidly connects to the fuel cell stack to receive exhaust output therefrom. The condensate generator includes an evaporator core with a refrigerant line that actively cool the exhaust via controlled circulation of refrigerant fluid. A condensate collector, which is fluidly connected to the condensate generator to receive the cooled exhaust, includes a reservoir housing containing therein a condensate trap. The condensate trap separates entrained water vapor from the cooled exhaust, and the reservoir housing collects the separated water vapor as liquid water. The aftertreatment system also includes a liquid storage container that is fluidly connected to the condensate collector to receive therefrom and store the collected water. An expansion device, which is fluidly connected to the condensate generator, selectively regulates the amount of refrigerant fluid that is received from a refrigerant system and passed into the evaporator core through the refrigerant line.

Additional aspects of this disclosure are directed to electric-drive vehicles with aftertreatment systems for extracting entrained water from exhaust output by the vehicle's fuel cell system. As used herein, the terms "vehicle" and "motor vehicle" may be used interchangeably and synonymously to include any relevant vehicle platform, such as passenger vehicles (e.g., hybrid electric, full electric, fully and partially autonomous, etc.), commercial vehicles, industrial vehicles, tracked vehicles, off-road and all-terrain vehicles (ATV), motorcycles, farm equipment, watercraft, aircraft, etc. Disclosed fuel cell stacks and aftertreatment systems may be employed in both automotive and non-automotive applications alike, including portable fuel cell generators, e.g., for powering residential and commercial devices, and stationary fuel cell power plants, e.g., for powering airports, hospitals, schools, banks, etc. In an example, an electric-drive vehicle is presented that includes a vehicle body with multiple road wheels and other standard original equipment. Also mounted to the vehicle body is a powertrain system with a prime mover, which may comprise one or more traction motors that operate alone or in conjunction with an internal combustion engine to drive one or more of the road wheels to thereby propel the vehicle. The vehicle is also equipped with a refrigerant system that outputs a phase-controlled refrigerant, and a fuel cell system operable to power the electric traction motor(s).

Continuing with the discussion of the above example, the electric-drive vehicle also includes a fuel cell exhaust aftertreatment system that is composed of a condensate generator, a condensate collector, a liquid storage container, an expansion device and, optionally, a two-phase flow separator. The condensate generator is fluidly connected to the fuel cell stack, e.g., via an optional gas-to-gas heat exchanger, to receive exhaust output from the stack. The condensate generator includes an evaporator core with a refrigerant line that cooperatively cool the stack's exhaust via controlled circulation of refrigerant fluid received from the refrigerant system. The condensate collector is fluidly connected to the condensate generator to receive therefrom the cooled exhaust. The condensate collector includes a condensate trap that separates entrained water vapor from the cooled exhaust, and a reservoir housing that collects the separated water vapor as liquid water. The liquid storage container is fluidly connected to the condensate collector, e.g., via a pump and filter, to receive and store the collected liquid water. The expansion device, which is fluidly interposed between the refrigerant system and condensate generator, selectively regulates the amount of refrigerant received from the refrigerant system and passed into the evaporator core through the refrigerant line.

Additional aspects of this disclosure are directed to control algorithms and memory-stored, processor-executable instructions for making or for using any of the disclosed vehicles, fuel cell stacks, and/or aftertreatment systems. In an example, a method is presented for governing operation of an exhaust aftertreatment system for a fuel cell stack. This representative method includes, in any order and in any combination with any of the above and below disclosed options and features: receiving exhaust output from the fuel cell stack via a condensate generator; actively cooling the exhaust via controlled circulation of refrigerant fluid by an evaporator core and refrigerant line of the condensate generator; receiving the cooled exhaust via a condensate collector fluidly connected to the condensate generator; separating entrained water vapor from the cooled exhaust via a condensate trap contained in a reservoir housing of the condensate collector; collecting the separated water vapor as liquid water via the reservoir housing; receiving and storing the collected liquid water via a liquid storage container fluidly connected to the condensate collector; and selectively regulating, via an expansion device fluidly connected to the condensate generator, an amount of the refrigerant fluid received from a refrigerant system and passed into the evaporator core through the refrigerant line.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
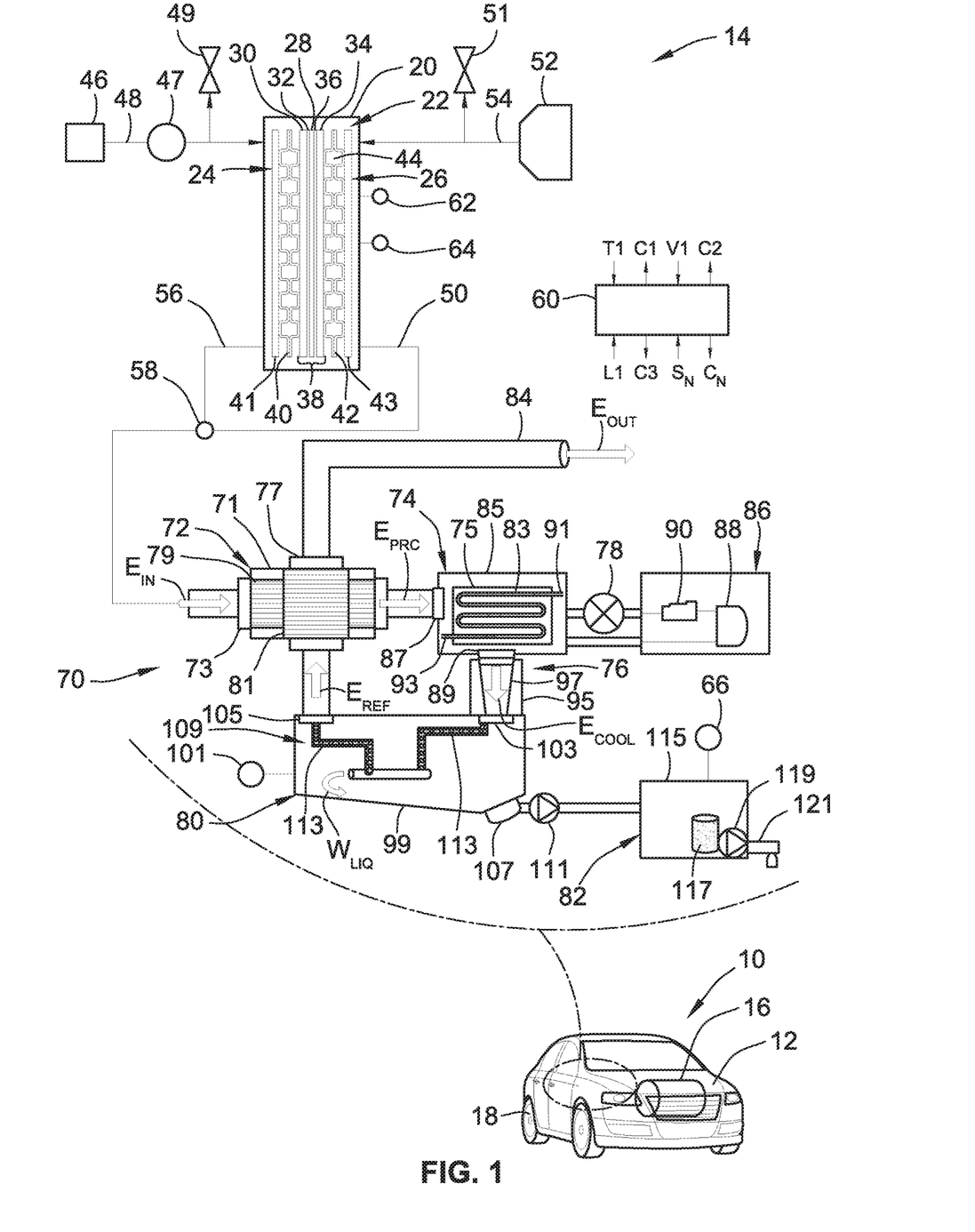
FIG. 1 is a perspective view illustration of a representative motor vehicle with an inset schematic diagram of a representative fuel cell stack architecture with an exhaust aftertreatment system in accordance with aspects of the present disclosure.

Referring now to the drawings, wherein like reference numbers refer to like features throughout the several views, there is shown in FIG. 1 a representative automobile, which is designated generally at 10 and portrayed herein for purposes of discussion as a sedan-style, hybrid electric or full electric ("electric-drive") passenger vehicle. Packaged within the vehicle body 12 of automobile 10 is a representative fuel cell system, designated generally at 14, for powering one or more traction motors, such as electric motor generator unit (MGU) 16, operable for driving the vehicle's road wheels 18. The illustrated automobile 10—also referred to herein as "motor vehicle" or "vehicle" for short—is merely an exemplary application with which aspects and features of this disclosure may be practiced. In the same vein, implementation of the present concepts into a PEMFC-type fuel cell system 14 should also be appreciated as an exemplary application of the novel concepts disclosed herein. As such, it will be understood that aspects and features of the present disclosure may be applied to other fuel cell system architectures, utilized for other automotive and non-automotive applications, and implemented by any logically relevant type of motor vehicle. Lastly, the drawings presented herein are not necessarily to scale and are provided purely for instructional purposes. Thus, the specific and relative dimensions shown in the drawings are not to be construed as limiting.

Proton exchange membrane fuel cell system 14 of FIG. 1 is equipped with one or more fuel cell stacks 20, each of which is composed of multiple fuel cells 22 of the PEM type that are mounted in electrical series or parallel with one another. In the illustrated architecture, each fuel cell 22 is a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. These two catalyst layers 32 and 36 cooperate with the membrane 28 to define, in whole or in part, an MEA 38. To remain pointed and succinct, only select components of the motor vehicle 10 and fuel cell system 14 have been shown and will be herein described in additional detail. Nevertheless, the vehicles, systems and devices discussed below may include numerous additional and alternative features, and other commercially available peripheral components, for example, to carry out the various protocols and algorithms of this disclosure.

The diffusion media layers 30 and 34 are porous constructions that provide for fluid inlet transport to and fluid exhaust transport from the MEA 38. An anode flow field plate (or "first bipolar plate") 40 is provided on the anode side 24 in abutting relation to the anode diffusion media layer 30. In the same vein, a cathode flow field plate (or "second bipolar plate") 42 is provided on the cathode side 26 in abutting relation to the cathode diffusion media layer 34. Coolant flow channels 44 traverse each of the bipolar plates 40 and 42 to allow cooling fluid to flow through the fuel cell 22. Respective fluid inlet ports and manifolds direct hydrogen fuel and oxidant to passages in the anode and cathode flow field plates. The MEA 38 and bipolar plates 40, 42 may be stacked together between stainless steel clamping plates 41 and 43 and monopolar end plates (not shown). These clamping plates 41, 43 may be electrically insulated from the end plates by a gasket or dielectric coating (not shown). The fuel cell system 14 may also employ anode recirculation where an anode recirculation gas is fed from an exhaust manifold through an anode recirculation line for recycling hydrogen back to the anode side 24 input so as to conserve hydrogen gas in the stack 20.

Hydrogen ($H_2$) inlet flow—be it gaseous, concentrated, entrained or otherwise—is transmitted from a hydrogen/nitrogen source 46 to the anode side 24 of the fuel cell stack 20 via a fluid injector 47 coupled to a (first) fluid intake conduit or hose 48. Anode exhaust exits the stack 20 via a (first) fluid exhaust conduit or hose 50; anode exhaust conduit 50 directs the exhaust to an exhaust aftertreatment system 70. A central active region of the anode's bipolar plate 40 that confronts the proton-conductive membrane 28 may be fabricated with a working face having an anode flow field with serpentine flow channels for distributing hydrogen over an opposing face of the membrane 28. A compressor or pump 52 provides a cathode inlet flow, e.g., of ambient air, deionized water (DI $H_2O$) and/or concentrated gaseous oxygen ($O_2$), via a (second) fluid intake conduit or hose 54 to the cathode side 26 of the stack 20. Cathode exhaust is output from the stack 20 via a (second) fluid exhaust conduit or hose 56; cathode exhaust conduit 56 directs the exhaust to an exhaust manifold 58 for combining with anode exhaust prior to transmission aftertreatment system 70. Flow control valves, flow restrictions, filters, and other suitable devices for regulating fluid flow can be implemented by the fuel cell system 14 of FIG. 1. For example, a hydrogen bleed valve 49 bleeds or otherwise redirects a metered volume of hydrogen flow from the anode's fluid intake conduit 48 to the cathode inlet (e.g., via fluid intake conduit 54). In the same vein, an oxygen bypass valve 51 bypasses or otherwise redirects a metered volume of air to the one or both exhaust conduits 50, 56 so that outlet hydrogen concentration is diluted.

Programmable electronic control unit (ECU) 60 helps to control operation of the fuel cell system 14. As an example, ECU 60 receives one or more temperature signals T1 from the temperature sensor 62 that indicates the temperature of the fuel cell stack 20; ECU 60 may be programmed to responsively issue one or more command signals C1 to modulate operation of the stack 20 and or exhaust aftertreatment system 70. ECU 60 of FIG. 1 also receives one or more voltage signals V1 from the voltage sensor 64; ECU 60 may be programmed to responsively issue one or more command signals C2 to modulate operation of the hydrogen source 46 and/or compressor/pump 52 to thereby regulate the electrical output of the stack 20. ECU 60 of FIG. 1 is also shown receiving one or more fluid level signals L1 from a water level indicator 66; ECU 60 may be programmed to responsively issue one or more command signals C3 to modulate operation of the exhaust aftertreatment system 70. Additional sensor signals SN may be received by, and additional control commands CN may be issued from the ECU 60, e.g., to control any other subsystem or component illustrated and/or described herein. An exemplary algorithm executable by the ECU 60 for extracting entrained water from fuel cell exhaust is discussed below in more detail. In FIG. 1, the arrows originating from or extending to the ECU 60 are emblematic of electronic signals or other communication exchanges by which data and/or control commands are transmitted from one component to the other.

With continuing reference to FIG. 1, the fuel cell system 14 is provided with a fuel cell exhaust aftertreatment system 70 that is designed to extract and transfer liquid water from the moisture-rich exhaust of the system's fuel cell stack(s) 20. The representative aftertreatment system 70 portrayed in the drawings is composed of six primary subsystem components: an exhaust preconditioner 72, a condensate generator 74, a two-phase flow separator 76, an expansion device 78, a condensate collector 80, and a liquid storage container 82. The aftertreatment system 70 architecture illustrated in FIG. 1 allows users to capture and store liquid water that is a natural by-product of the fuel cell's electrical generation process. The system 70 will also allow the user or, in cases of fully or partially automated systems, a programmable electronic controller to decide how water to generate. Attendant benefits for at least some of the disclosed concepts may include improved fuel cell system reliability, increased system efficiency, reduced start up time during cold/freeze starts, decreased system emissions, and reduced overall system costs. The system can also be configured to bypass some or all the exhaust flow around system 70 to reduce exhaust back pressure or during freezing temperature operation.

Exhaust preconditioner 72 is a passive cooling device that recycles refrigerated exhaust gases $E_{REF}$ recirculated back from the condensate generator 74 to pre-cool incoming fuel cell exhaust $E_{IN}$ received via the aftertreatment system 70 from the fuel cell stack(s) 20. In accord with the representative architecture of FIG. 1, the exhaust preconditioner 72 is interposed between the condensate generator 74 and the fuel cell stack(s) 20, fluidly connected upstream from the condensate generator's evaporator core 75 and downstream from the stack's exhaust conduits 50, 56 and manifold 58. The exhaust preconditioner 72 may be in the nature of a gas-to-gas type heat exchanger designed to passively cool exhaust that is output from the fuel cell 22 prior to being received by the condensate generator 74. While enumerated above as one of the six primary subsystem components of the exhaust aftertreatment system 70, it is envisioned that the exhaust preconditioner 72 may be eliminated from the aftertreatment system 70 architecture, e.g., for applications in temperate or cool operating conditions. Moreover, the exhaust preconditioner 72 may take on a variety of different forms within the intended scope of this disclosure, including gas-to-gas, gas-to-air, and gas-to-liquid type passive heat exchangers.

The exhaust preconditioner 72 assembly of FIG. 1 is composed of a fluid-tight outer housing ("exchanger housing") 71 with a first set of air ducting 73 (e.g., stack exhaust inlet and outlet headers) that fluidly connects the condensate generator 74 to the fuel cell stack 20 such that the incoming fuel cell exhaust $E_{IN}$ passes through the gas-to-gas heat exchanger stowed inside the housing 71. The exchanger housing 71 is also fabricated with a second set of air ducting 77 (e.g., recycled exhaust inlet and outlet headers) that fluidly connects the condensate collector 80 to an exhaust line 84 such that the refrigerated exhaust gases $E_{REF}$ pass through the gas-to-gas heat exchanger and out of the fuel cell system 14. The gas-to-gas heat exchanger may be generally composed of a first set of substantially parallel flow passages 79, e.g., defined by a first stack of spaced, thin metal ducts, that fluidly connects inlet and outlet ends of the first air ducting 73, and a second set of substantially parallel flow passages 81, e.g., defined by a second stack of spaced, thin metal ducts, that fluidly connects inlet and outlet ends of the second air ducting 77. The first set of flow passages 79 is mutually parallel to and interleaved with (e.g., in a crisscross pattern) the second set of flow passages 81. With this configuration, refrigerant-cooled gaseous exhaust is returned from the condensate generator 74 and repurposed by the exhaust preconditioner 72 to "pre-cool" exhaust output by the stack 20 via thermal conductivity through separating walls of the interleaved passages 79, 81. Passive cooling of the fuel cell exhaust in this manner allows the exhaust aftertreatment system 70 to chill incoming exhaust with no additional energy expenditure, thus, increasing the overall efficiency of the system 70.

By way of contrast to the passive cooling capabilities provided by the exhaust preconditioner 72, condensate generator 74 is a refrigerant-based heat exchange system that provides active cooling capabilities. In accord with the representative architecture of FIG. 1, the condensate generator 74 is interposed between the exhaust preconditioner 72 and condensate collector 80, fluidly connected downstream from the gas-to-gas heat exchanger to receive preconditioned exhaust $E_{PRC}$ output therefrom. The condensate generator 74 assembly is generally composed of an evaporator core 75 that cooperates with a refrigerant line 83 to actively cool the exhaust $E_{PRC}$ via controlled circulation of cooled refrigerant fluid received from a refrigerant system 86. The evaporator core 75 is stored inside a thermally insulated outer housing ("core housing") 85 with exhaust inlet and outlet ports 87 and 89, respectively, for intake and discharge of the preconditioned exhaust $E_{PRC}$. Core housing 85 is also fabricated with refrigerant inlet and outlet ports 91 and 93, respectively, for intake and discharge of the refrigerant fluid.

During fuel cell stack operation, the refrigerant system 86, which may comprise a positive-displacement or hydrodynamic compressor 88 operatively coupled to a fluid condenser 90, supplies high-pressure, low-enthalpy refrigerant fluid (liquid and vapor) to the condensate generator 74 via refrigerant inlet port 91. The cool refrigerant fluid circulates through the refrigerant line 83 as the exhaust $E_{PRC}$ passes through the evaporator core 75. Circulating refrigerant sufficiently cools the pre-chilled fuel cell exhaust $E_{PRC}$ to a temperature that induces condensation of water vapor entrained within the exhaust gas. High-enthalpy, low-pressure refrigerant fluid (gas) is thereafter returned from the evaporator core 75 to the refrigerant system 86. For at least some desired system configurations, a receiver dryer designed to store and dry refrigerant may be incorporated into the refrigerant system 86, located downstream from the condenser 90 (e.g., in applications using a TXV or eXV). In this regard, an accumulator dryer for collecting and drying refrigerant may be placed downstream from the compressor 88 and upstream from the condenser 90 (e.g., in system architectures employing an orifice tube or capillary tube). As a further option, expansion device 78 may be incorporated into refrigerant system 86 or, as shown, may be packaged as a discrete part that is readily accessible by a vehicle driver or occupant.

With the foregoing system architecture, the condensate generator 74 may be operated independent of or in cooperation with the exhaust preconditioner 72. For instance, the exhaust aftertreatment system 70 may operates in a passive cooling mode, in which the condensate generator 74 is deactivated and/or the refrigerant system 86 is redirected to cool a vehicle cabin such that water is extracted from fuel cell exhaust based almost solely on ambient temperatures using the preconditioner 72. Aftertreatment system 70 may also operate in an energy-efficient hybrid cooling mode, in which the condensate generator 74 is activated, the refrigerant system 86 splits cooling between the aftertreatment system 70 and vehicle cabin, and water is extracted from fuel cell exhaust based on a combination of passive and active heat exchange. As a further option, the aftertreatment system 70 may operate in a high-output active cooling mode, in which most/all of the compressor output is directed to the condensate generator 74 for maximum H2O capture.

Thermal output of the evaporator core 75 may be modulated by an expansion device 78, which may be an orifice device, a capillary tube, a pneumatically controlled flow-control device, or an electronic device governed by a resident controller, such as programmable ECU 60. In this vein, the expansion device 78 may be in the nature of a thermostatic expansion valve or a controller-automated expansion valve that separates the high-pressure and low-pressure sides of refrigerant system 86 and concomitantly regulates the rate at which liquid refrigerant flows into the evaporator core 75. A thermostatic expansion valve (TXV) may use a temperature-sensitive pneumatic control system to regulate refrigerant flow, whereas an electronic expansion valve (eXV) may use a stepper motor, external pressure and temperature sensors, and a computer control system to regulate refrigerant flow. This expansion device 78 also allows for refrigerant flow to be modulated for a desired evaporator temperature at a given operating pressure (e.g., during transient operating conditions of the fuel cell system 14). Additionally, the expansion device 78 helps to ensure that gaseous (vapor) refrigerant, rather than liquid refrigerant, is returned to the compressor 88. Proper control of refrigerant temperature via the expansion device 78 also helps to reduce temperature variations across the evaporator face to thereby maximize water collection.

Positioned between the condensate generator 74 and condensate collector 80 is a two-phase flow separator 76 that passively initiates separation of entrained water from the cooled exhaust $E_{COOL}$ received from the evaporator core 75. In accord with the illustrated example, the two-phase flow separator 76 assembly is fabricated with a rigid outer housing ("separator housing") 95 with inlet and outlet ports for intake and discharge of the exhaust $E_{COOL}$, respectively. A stationary spiral vane 97 is elongated axially within the separator housing 95, extending between the separator inlet and outlet ports. This spiral vane 97 causes the cooled exhaust $E_{COOL}$ to spin or "stir" in a vortex-like motion; this imparts centrifugal forces to the exhaust $E_{COOL}$ stream to thereby initiate separation of the gas and liquid phases in the cooled exhaust $E_{COOL}$. The two-phase flow separator 76 may also assist with removing solid impurities and other contaminants from the exhaust flow.

Downstream from the two-phase flow separator 76 is a condensate collector 80 for trapping and collecting the liquid water from the exhaust stream and selectively transferring it to liquid storage container 82. As shown, the condensate collector 80 assembly is provided with a fluid-tight outer housing ("reservoir housing") 99 with a level switch 101 for gauging the amount of condensate accumulated as liquid water in the base of the reservoir housing 99. The reservoir housing 99 is formed with inlet and outlet ports 103 and 105, respectively, through which cooled exhaust $E_{COOL}$ is received from the condensate generator 74 and output to the exhaust preconditioner 72. A sump port and line 107 fluidly connects the condensate collector 80 to the liquid storage container 82 such that liquid water $W_{LIQ}$ collected by the reservoir housing 99 is transferable therebetween. A condensate trap 109 mounted inside the reservoir housing 99 functions to extricate entrained water from cooled exhaust $E_{COOL}$, return refrigerated exhaust gases $E_{REF}$ to the exhaust preconditioner 72 for pre-cooling of incoming exhaust $E_{IN}$ (as described above), and redirecting the extracted water to the base of the reservoir housing 99. A water reservoir pump 111 fluidly connected to the sump port 107 is operable to selectively pump collected liquid water from the reservoir housing 99 to the liquid storage container 82. Operation of the water reservoir pump 111 may be automated, e.g., via ECU 60, based on a water level detected via the level switch 101 and/or in the event of freezing ambient temperatures.

With continuing reference to the inset view of FIG. 1, the condensate collector 80 also serves as a silencing volume to mitigate noise and vibration passing through the exhaust aftertreatment system 70. As a non-limiting example, the reservoir housing 99 may be shaped to vibrate at a predetermined resonant frequency and thereby attenuate compressor noise and vibration transmitted from the refrigerant system 86. As another or alternative option, one or more of the fluid conduits used to form the condensate trap 109 may comprise a set of perforated tubes 113 cooperatively designed to reflect and thereby dampen sound waves propagated by the refrigerant system 86.

The liquid storage container 82 may generally comprise of one or more fluid-tight storage tanks 115 stowing therein an optional water dispensing pump 117 and water filter 119, e.g., if potable water is desired. Water filtration may be achieved through any suitable means, including a pleated-fabric filter bag or an activated-charcoal filter canister. The water dispensing pump 117 metes out stored water and, like the water reservoir pump 111, may automatically drain the storage container 82 in the event of freezing conditions. The fluid-tight storage tank 115 is provided with a manual or electronic valve 121 through which the stored liquid water is selectively discharged from the liquid storage container 82. Water level indicator 66 outputs sensor signals indicative of a real-time volume of water present in the storage container 82.

Figure 2:
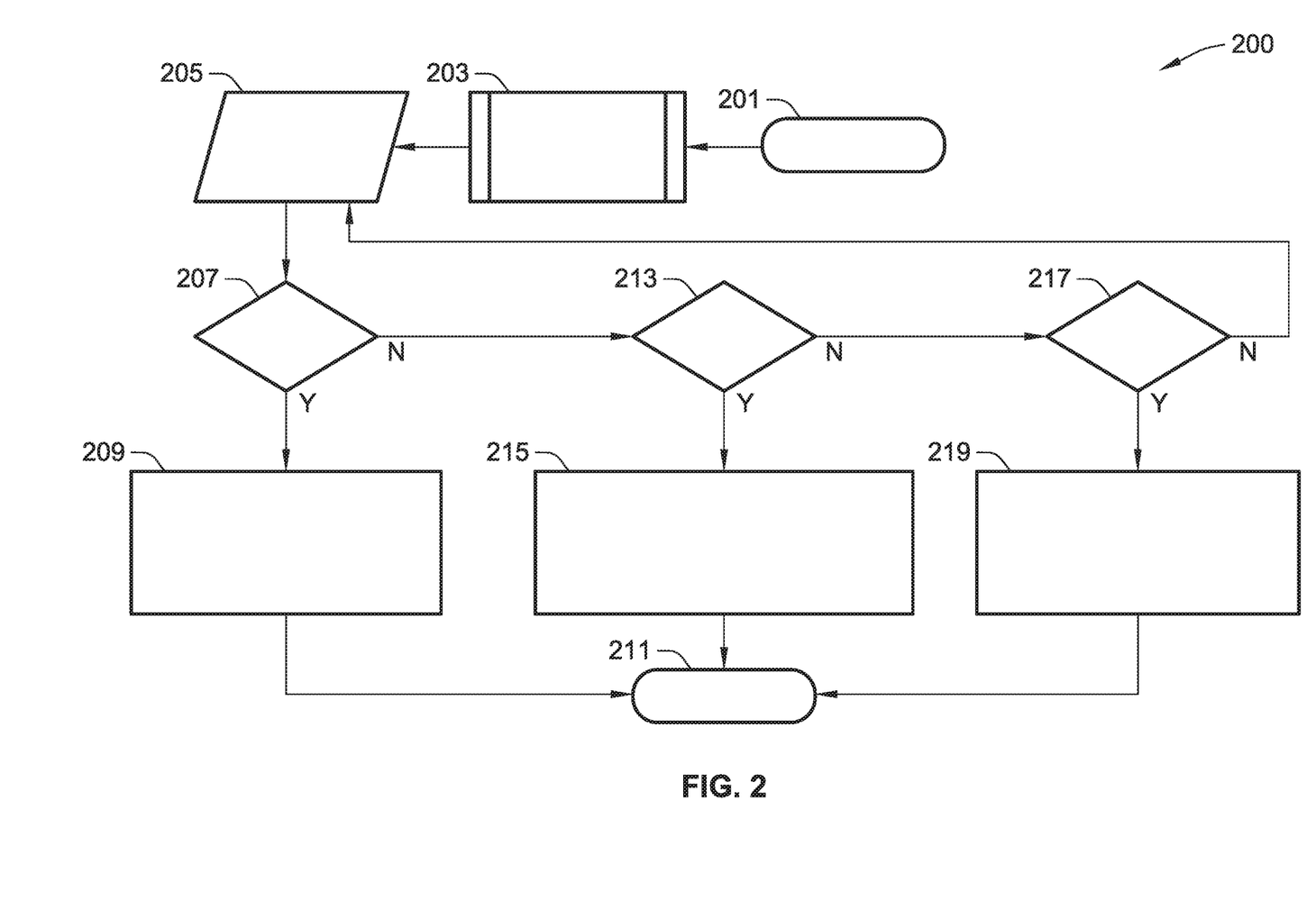
FIG. 2 is a flowchart illustrating a representative exhaust aftertreatment protocol for extracting entrained water from fuel cell system exhaust, which may correspond to memory-stored instructions executed by an onboard or remote controller, control-logic circuitry, programmable electronic control unit, or other integrated circuit (IC) device or a network of IC devices in accord with aspects of the disclosed concepts.

With reference next to the flow chart of FIG. 2, an improved exhaust aftertreatment protocol for extracting entrained water from the exhaust of a fuel cell system, such as fuel cell system 14 of FIG. 1, of an electric-drive vehicle, such as vehicle 10 of FIG. 1, is generally described at 200 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a real-time fuel cell exhaust water extraction protocol. This routine may be executed in real-time, continuously, systematically, sporadically, and/or at regular intervals, for example, each 100 milliseconds, during active or autonomous vehicle operation. As yet another option, block 201 may initialize responsive to a user prompt from an occupant of a vehicle or a broadcast prompt signal from a backend or middleware computing node tasked with collecting, analyzing, sorting, storing and distributing vehicle commands and data. To carry out this protocol, a vehicle control system or any combination of one or more subsystems may be operable to receive, process, and synthesize pertinent information and inputs, and execute control logic and algorithms to regulate various powertrain system, heating, ventilation and cooling (HVAC) system, fuel cell system, and/or battery system components to achieve desired control targets.

Advancing from terminal block 201 to predefined process block 203, the method 200 of FIG. 2 commences water capture using an exhaust water extraction system, such as exhaust aftertreatment system 70 of FIG. 1. As described above, fuel cell exhaust water extraction may begin with a passive heat exchanger, such as the gas-to-gas heat exchanger in exhaust preconditioner 72 of FIG. 1, receiving exhaust output from a fuel cell stack, such as fuel cell stack(s) 20. The passive heat exchanger preconditions the exhaust gas and transfers this chilled exhaust to an active heat exchanger. For instance, condensate generator 74 of FIG. 1 receives preconditioned exhaust $E_{PRC}$ output from exhaust preconditioner 72. After receiving the pre-chilled exhaust, the active heat exchanger cools the exhaust, e.g., via controlled circulation of a refrigerant fluid through a refrigerant line inside an evaporator core. A cyclonic phase separator, such as two-phase flow separator 76 of FIG. 1, is fluidly connected to the active heat exchanger and initiates separation of entrained water vapor from the cooled exhaust.

The water capture operation of predefined process block 203 of FIG. 2 may further include a condensation trapping and collecting device, such as condensate collector 80 of FIG. 1, receiving the cooled exhaust, trapping separated water vapor from the cooled exhaust, and concurrently collecting the trapped water vapor as liquid water. A fluid-tight reservoir, such as liquid storage container 82, receives and stores the collected liquid water for future use, e.g., via a vehicle powertrain or HVAC system or via a vehicle occupant or a third-party user. The amount of exhaust-cooling refrigerant received from a refrigerant system and passed into the active heat exchanger may be selectively regulated via a suitable flow control device, such as expansion device 78 of FIG. 1.

Prior to, contemporaneous with, or subsequent to initiating fuel cell exhaust water capture, a user or a system controller may selectively modulate the amount of water that is acquired and stored by the exhaust water extraction system. Input/output block 205 of FIG. 2, for example, includes receiving (e.g., from a user via a suitable human machine interface (HMI)) or transmitting (e.g., via a resident vehicle controller over a suitable network connection interface) a mode selection for the exhaust water extraction system. At decision block 207, the method 200 determines whether the selected mode is a passive cooling mode. If so (block 207=YES), the method 200 advances to process block 209 with processor-executable instructions to transmit a deactivation signal to the active heat exchange device (e.g., condensate generator 74) and/or a shutoff flow control signal to a refrigerant valve (e.g., expansion device 78) to discontinue refrigerant flow to the active heat exchange device. Once these measures are completed, the method 200 of FIG. 2 may advance from process block 209 to terminal block 211 and terminate, or may loop back to terminal block 201 and run in a continuous loop.

Upon determining that the selected mode is not passive cooling (block 207=NO), method 200 proceeds to decision block 213, the method 200 to determine whether the selected mode is a normal ("hybrid") cooling mode. If so (block 213=YES), the method 200 advances to process block 215 with processor-executable instructions to transmit an activation signal to the active heat exchange device (e.g., condensate generator 74) and/or a split-flow control signal to a refrigerant valve (e.g., expansion device 78) to split refrigerant flow between to the active heat exchange device and a vehicle HVAC system that cools and heats the vehicle's passenger cabin. If the selected mode is not the normal ("hybrid") cooling mode (block 213=NO), method 200 proceeds to decision block 217 to determine whether the selected mode is a maximum water extraction mode. If so (block 217=YES), the method 200 advances to process block 219 with processor-executable instructions to transmit an activation signal to the active heat exchange device (e.g., condensate generator 74) and/or a max-flow control signal to a refrigerant valve (e.g., expansion device 78) to transmit most/all refrigerant flow to the active heat exchange device. Once process blocks 215 or 219 are complete, the method 200 of FIG. 2 advances to terminal block 211 or loops back to terminal block 201.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An exhaust aftertreatment system for an electrochemical fuel cell stack operable to convert hydrogen-based fuel into electricity, the exhaust aftertreatment system comprising:
   a condensate generator configured to fluidly connect to the fuel cell stack to receive exhaust output therefrom, the condensate generator including an evaporator core with a refrigerant line configured to actively cool the exhaust via controlled circulation of a refrigerant fluid;
   a condensate collector fluidly connected to the condensate generator to receive therefrom the cooled exhaust, the condensate collector including a reservoir housing containing therein a condensate trap configured to separate entrained water vapor from the cooled exhaust, the reservoir housing collecting the separated water vapor as liquid water;
   a liquid storage container fluidly connected to the condensate collector to receive therefrom and store the collected liquid water; and
   an expansion device fluidly connected to the condensate generator and configured to regulate an amount of the refrigerant fluid received from a refrigerant system and passed into the evaporator core through the refrigerant line.

2. The exhaust aftertreatment system of claim 1, further comprising an exhaust preconditioner fluidly connected to the condensate generator upstream from the evaporator core and configured to passively cool the exhaust output from the fuel cell stack prior to being received by the condensate generator.

3. The exhaust aftertreatment system of claim 2, wherein the exhaust preconditioner includes an exchanger housing, a first air ducting configured to fluidly connect to the condensate generator and the fuel cell stack and to pass exhaust output from the fuel cell stack through the exchanger housing, and a second air ducting fluidly connecting the condensate collector to an exhaust line to pass therethrough the cooled exhaust separated from the water vapor such that the cooled exhaust pre-cools the exhaust output from the fuel cell stack and passing through the first air ducting.

4. The exhaust aftertreatment system of claim 3, wherein the exhaust preconditioner further includes a first set of substantially parallel flow passages fluidly connected to the first air ducting, and a second set of substantially parallel flow passages fluidly connected to the second air ducting and interleaved with the first set of parallel flow passages.

5. The exhaust aftertreatment system of claim 1, wherein the expansion device includes a controller-automated expansion valve, a thermostatic expansion valve, a capillary tube device, and/or an orifice tube device.

6. The exhaust aftertreatment system of claim 1, wherein the condensate generator further includes a core housing with exhaust inlet and outlet ports configured to pass therethrough the exhaust output from the fuel cell stack, and refrigerant inlet and outlet ports configured to pass therethrough the refrigerant fluid.

7. The exhaust aftertreatment system of claim 1, wherein the reservoir housing includes reservoir inlet and outlet ports configured to pass therethrough the cooled exhaust output from the condensate generator, and a sump port fluidly connected to the liquid storage container and configured to output the liquid water collected by the reservoir housing.

8. The exhaust aftertreatment system of claim 6, further comprising a water reservoir pump fluidly connected to the sump port and configured to pump the collected liquid water from the reservoir housing of the condensate collector to the liquid storage container.

9. The exhaust aftertreatment system of claim 6, wherein the reservoir housing is configured to attenuate noise and vibration passing through the exhaust aftertreatment system.

10. The exhaust aftertreatment system of claim 9, wherein the reservoir housing includes therein a set of perforated tubes cooperatively designed to reflect and thereby dampen sound waves produced by the refrigerant system.

11. The exhaust aftertreatment system of claim 1, further comprising a two-phase flow separator fluidly interposed between the condensate generator and the condensate collector and configured to initiate separation of the water vapor from the cooled exhaust.

12. The exhaust aftertreatment system of claim 11, wherein the two-phase flow separator includes a separator housing with a spiral vane elongated axially within the separator housing, the spiral vane being configured to impart centrifugal forces to the cooled exhaust to thereby initiate separation of the water vapor from the cooled exhaust.

13. The exhaust aftertreatment system of claim 1, wherein the liquid storage container includes a fluid-tight storage tank with a valve through which the stored liquid water is discharged from the liquid storage container.

14. The exhaust aftertreatment system of claim 13, wherein the liquid storage container further includes a filter configured to at least partially purify the stored liquid water, and a water pump configured to pump the stored liquid water from the liquid storage container.

15. An electric-drive vehicle comprising:
a vehicle body with a plurality of road wheels attached to the vehicle body;
an electric traction motor attached to the vehicle body and configured to drive one or more of the road wheels to thereby propel the electric-drive vehicle;
a refrigerant system configured to output therefrom a refrigerant fluid;
a fuel cell system operable to power the electric traction motor and including a fuel cell stack with a cathode, an anode, and a proton exchange membrane disposed between the cathode and anode; and
a fuel cell exhaust aftertreatment system including:
a condensate generator fluidly connected to the fuel cell stack to receive exhaust output therefrom, the condensate generator including an evaporator core with a refrigerant line configured to actively cool the exhaust via controlled circulation of the refrigerant fluid received from the refrigerant system;
a condensate collector fluidly connected to the condensate generator to receive therefrom the cooled exhaust, the condensate collector including a reservoir housing containing therein a condensate trap configured to separate entrained water vapor from the cooled exhaust, the reservoir housing collecting the separated water vapor as liquid water;
a liquid storage container fluidly connected to the condensate collector to receive therefrom and store the collected liquid water; and
an expansion device fluidly interposed between the refrigerant system and the condensate generator and configured to regulate an amount of the refrigerant fluid received from the refrigerant system and passed into the evaporator core through the refrigerant line.

* * * * *